Nov. 26, 1929.  H. R. GIBBONS  1,736,959
METHOD OF ASSEMBLING BEARINGS
Original Filed April 13, 1927

INVENTOR:
HAROLD R. GIBBONS,
BY
Gales P. Moore
HIS ATTORNEY.

Patented Nov. 26, 1929

1,736,959

UNITED STATES PATENT OFFICE

HAROLD R. GIBBONS, OF CHATHAM, NEW JERSEY, ASSIGNOR TO GENERAL MOTORS CORPORATION, OF DETROIT, MICHIGAN, A CORPORATION OF DELAWARE

METHOD OF ASSEMBLING BEARINGS

Original application filed April 13, 1927, Serial No. 183,338. Divided and this application filed August 10, 1928. Serial No. 298,759.

This invention relates to antifriction bearings and is a division of my copending application Serial No. 183,338 filed April 13, 1927. An object of the invention is to provide an improved method of assembling or connecting a retaining ring and a race ring. To this end and to improve generally and in detail upon methods of assembling bearing parts, the invention also consists in the various matters hereinafter disclosed.

In the drawings Figure 1 is a transverse section of the assembled bearing.

Figure 1:
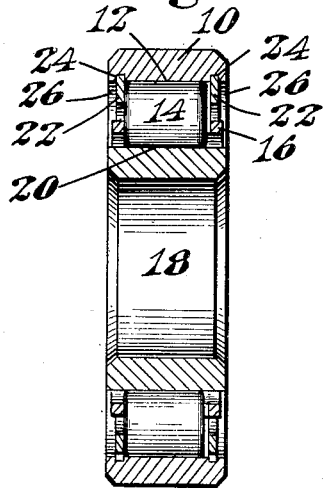
Figure 2:
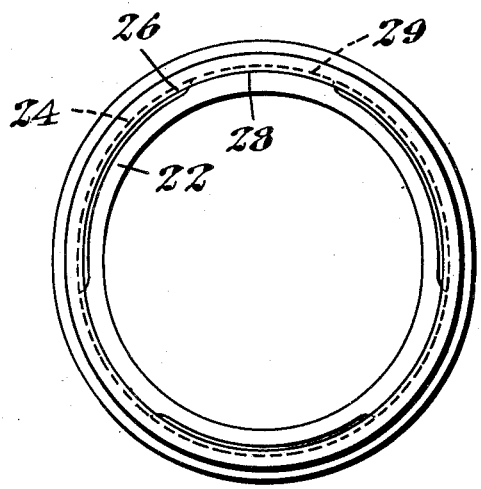
Figure 2 is a side view of the outer race ring with the retaining means applied.

The numeral 10 indicates an outer race ring having a cylindrical raceway 12 for a circular series of short cylindrical rollers 14 spaced by a band 16. The band has rectangular openings smaller than the rollers and is arranged inside the circle through the roller centers, thereby holding the rollers and the outer race ring assembled. A removable inner race ring 18, having a plain cylindrical race way 20, is arranged inside the circle of rollers.

Figure 3:
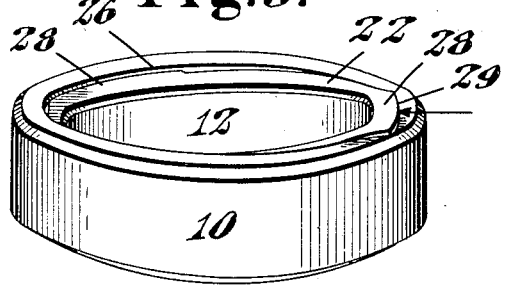
Figure 3 is a perspective view and Figure 4 is a transverse section of the outer race ring showing the method of applying the retainer rings.
Figure 4:
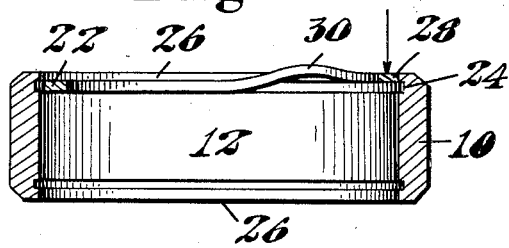

To retain the rollers against endwise movement and guide them during rotation, a pair of retaining rings 22 is secured in grooves 24 of the race ring 10 to engage the flat circular ends of the rollers. Outside the grooves 24 are lands or side walls 26 which lie in the same cylinder as the raceway 12. The rings 22 normally have a slight clearance with the ends of the rollers but their flat inner faces will resist any induced end thrust of the rollers and guide them. The rings 22 are assembled in the grooves in a manner not to permanently distort these flat inner faces and so preserving a continuous and uniform guiding surface over which the wear is evenly distributed. Each ring 22 is provided with a series of radial tongues or projections 28, preferably three. The outer edges 29 of the tongues lie in an arc of a diameter to fit the bottom of the groove and the outer edges of the remaining portions of the ring lie in an arc of a diameter to clear the land 26. Two of the tongues lie wholly on one side of a diameter of the retaining ring and are spaced widely apart by an easily deformable arcuate portion. Another tongue lies on the other side of the diameter opposite the space between the first tongues and is widely spaced from the first tongues by easily deformable arcuate portions. In assembling the ring, one (or more) of the tongues 28 is laid in the groove 24 and pressure is then applied radially against the remaining tongue or tongues in the direction of the arrow in Figure 3. This causes the weaker portions of the ring to bulge outwardly as indicated at 30 in Figure 4 and, by exerting pressure in the direction of the arrow in Figure 4, the remaining tongue 28 will be carried across the land 26 until it snaps into the groove. The land 26 is utilized to hold the ring temporarily in its deformed condition as the remaining tongue is moved laterally into line with the groove. The ring then immediately regains its original shape and lies flat. Assembly is purely by elastic deformation, there being no permanent intermediate shape to which the ring tends to return. It is not necessary to have any shoulders and except for the grooves, the inner race ring is straight across, thereby facilitating manufacture.

Figure 5:
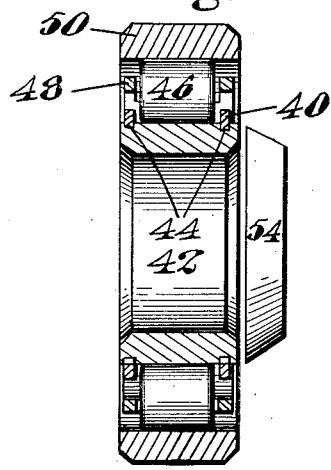
Figure 5 is a transverse section of a modified bearing.
Figure 6:
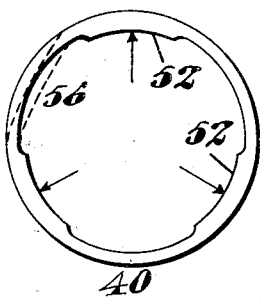
Figure 6 is a side view of the retaining means for said bearing.

Figures 5 and 6 illustrate retaining means 40 for an inner race ring 42 having grooves 44 and rollers 46 spaced by a band 48 outside the circle through the roller centers. There is a removable outer race ring 50. The retaining means 40 is provided with a series of inner tongues or projections 52, preferably three. In assembling the ring 40 with the inner race, a conical member 54 is convenient to use. By pressing the ring 40 laterally against the conical surface, a radial pressure is also produced in the direction of the arrows in Figure 6. This stretches the ring, deformation taking place in the region 56 where the ring is weakest and allowing the ring to be crowded over into the groove. If desired, one or more of the tongues can be first inserted in the groove and lateral pressure applied to the remaining tongue or tongues to force the latter along the conical surface into line with the groove.

I claim:

1. The method of applying a continuous retaining ring having projecting tongues to a grooved race ring which consists in inserting a tongue of the retaining ring in the groove of the race ring, and applying radial and lateral pressure to a remaining tongue, the radial pressure temporarily deforming the ring within its elastic limits and the lateral pressure carrying the remaining tongue into line with the groove; substantially as described.

2. The method of applying a continuous retaining ring having projecting portions at its periphery to a grooved race ring, which consists in inserting a projecting portion of the peripheral edge of the retaining ring in the grove of the race ring, applying radial pressure to another projecting portion of the retaining ring to cause elastic deformation, and applying lateral pressure to said portion of the ring to carry it into a position where it will snap into the groove; substantially as described.

3. The method of applying a continuous retaining ring having projecting portions at its periphery to a grooved race ring, which consists in inserting a projecting portion of the peripheral edge of the retaining ring in the groove of the race ring, applying radial pressure to another projecting portion of the retaining ring to cause elastic deformation, utilizing a side wall of the groove to temporarily hold the ring in its deformed condition, and moving the last mentioned projecting portion laterally into line with the groove; substantially as described.

4. The method of assembling a grooved race ring and a retaining ring having peripheral portions of substantially the same diameter as the bottom of the groove, which consists in inserting a portion of the peripheral edge of the retaining ring in the groove, and applying pressure to another portion of the retaining ring to cause sufficient elastic deformation to allow said portion to pass across the side wall of the groove without permanent distortion; substantially as described.

5. The method of inserting a flat sided retaining ring in a groove of the same diameter in a race ring, which consists in inserting a portion of the periphery of the ring in the groove, applying radial pressure to another portion of the retaining ring to cause elastic deformation, and applying lateral pressure to said last portion of the retaining ring to carry it into line with the groove; substantially as described.

In testimony whereof I hereunto affix my signature.

HAROLD R. GIBBONS.